(12) United States Patent
Sindhu et al.

(10) Patent No.: US 12,360,811 B2
(45) Date of Patent: *Jul. 15, 2025

(54) DATA PROCESSING UNIT FOR STREAM PROCESSING

(71) Applicant: Microsoft Technology Licensing, LLC, Redmond, WA (US)

(72) Inventors: Pradeep Sindhu, Los Altos Hills, CA (US); Jean-Marc Frailong, Rancho Mirage, CA (US); Wael Noureddine, Santa Clara, CA (US); Felix A. Marti, San Francisco, CA (US); Deepak Goel, San Jose, CA (US); Rajan Goyal, Saratoga, CA (US); Bertrand Serlet, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,070

(22) Filed: Nov. 1, 2023

(65) Prior Publication Data

US 2024/0061713 A1    Feb. 22, 2024

Related U.S. Application Data

(63) Continuation of application No. 16/939,617, filed on Jul. 27, 2020, now Pat. No. 11,842,216, which is a
(Continued)

(51) Int. Cl.
*G06F 9/50* (2006.01)
*G06F 9/46* (2006.01)
(Continued)

(52) U.S. Cl.
CPC .............. *G06F 9/5027* (2013.01); *G06F 9/46* (2013.01); *G06F 15/17337* (2013.01); *H04L 41/34* (2022.05); *H04L 47/50* (2013.01)

(58) Field of Classification Search
CPC .... G06F 9/5027; G06F 15/17337; G06F 9/46; H04L 41/34; H04L 47/50
See application file for complete search history.

(56) References Cited

U.S. PATENT DOCUMENTS

| 11,842,216 B2* | 12/2023 | Sindhu | G06F 9/5027 |
| 2006/0070072 A1* | 3/2006 | Togawa | G06F 9/5016 718/100 |

(Continued)

*Primary Examiner* — Kenneth Tang
(74) *Attorney, Agent, or Firm* — Alleman Hall & Tuttle LLP

(57) ABSTRACT

A new processing architecture is described that utilizes a data processing unit (DPU). Unlike conventional compute models that are centered around a central processing unit (CPU), the DPU that is designed for a data-centric computing model in which the data processing tasks are centered around the DPU. The DPU may be viewed as a highly programmable, high-performance I/O and data-processing hub designed to aggregate and process network and storage I/O to and from other devices. The DPU comprises a network interface to connect to a network, one or more host interfaces to connect to one or more application processors or storage devices, and a multi-core processor with two or more processing cores executing a run-to-completion data
(Continued)

plane operating system and one or more processing cores executing a multi-tasking control plane operating system. The data plane operating system is configured to support software functions for performing the data processing tasks.

16 Claims, 7 Drawing Sheets

Related U.S. Application Data continuation of application No. 16/031,945, filed on Jul. 10, 2018, now Pat. No. 10,725,825.

(60) Provisional application No. 62/589,427, filed on Nov. 21, 2017, provisional application No. 62/559,021, filed on Sep. 15, 2017, provisional application No. 62/530,691, filed on Jul. 10, 2017.

(51) Int. Cl.
  *G06F 15/173* (2006.01)
  *H04L 41/34* (2022.01)
  *H04L 47/50* (2022.01)

(56) References Cited

U.S. PATENT DOCUMENTS

| | | | |
|---|---|---|---|
| 2006/0179204 A1* | 8/2006 | Cohen | H04L 45/60 710/316 |
| 2008/0270710 A1* | 10/2008 | Kwon | G06F 12/109 711/147 |
| 2008/0282058 A1* | 11/2008 | Maher | G06F 9/30167 712/7 |
| 2012/0011351 A1* | 1/2012 | Mundra | H04L 9/3242 713/192 |
| 2013/0339968 A1* | 12/2013 | Boland | H04L 47/522 718/103 |
| 2014/0040909 A1* | 2/2014 | Winser | G06F 9/50 718/104 |
| 2015/0143073 A1* | 5/2015 | Winser | G06F 9/3877 712/3 |
| 2015/0244804 A1* | 8/2015 | Warfield | H04L 49/90 709/219 |
| 2017/0163575 A1* | 6/2017 | Wang | H04L 49/9094 |
| 2017/0346687 A1* | 11/2017 | Piecuch | H04L 41/0886 |
| 2018/0083866 A1* | 3/2018 | Gobriel | H04L 45/02 |

* cited by examiner

DATA PROCESSING UNIT FOR STREAM PROCESSING

This application is a continuation application of U.S. application Ser. No. 16/939,617, filed Jul. 27, 2020, which is a continuation application of U.S. application Ser. No. 16/031,945, filed on Jul. 10, 2018, now U.S. Pat. No. 10,725,825, which claims the benefit of U.S. Provisional Appl. No. 62/530,691, filed Jul. 10, 2017, U.S. Provisional Appl. No. 62/559,021, filed Sep. 15, 2017, and U.S. Provisional Appl. No. 62/589,427, filed Nov. 21, 2017, the entire content of each of which is incorporated herein by reference.

TECHNICAL FIELD

This disclosure relates to devices for processing stream data, for example, in the fields of networking and storage.

BACKGROUND

Conventional computing devices typically include components such as a central processing unit (CPU), a graphics processing unit (GPU), random access memory, storage, and a network interface card (NIC), such as an Ethernet interface, to connect the computing device to a network. Typical computing devices are processor centric such that overall computing responsibility and control is centralized with the CPU. As such, the CPU performs processing tasks, memory management tasks such as shifting data between local caches within the CPU, the random access memory, and the storage, and networking tasks such as constructing and maintaining networking stacks, and sending and receiving data from external devices or networks. Furthermore, the CPU is also tasked with handling interrupts, e.g., from user interface devices. Demands placed on the CPU have continued to increase over time, although performance improvements in development of new CPUs have decreased over time. General purpose CPUs are normally not designed for high-capacity network and storage workloads, which are typically packetized. In general, CPUs are relatively poor at performing stream data processing, because such traffic is fragmented in time and does not cache well. Nevertheless, server devices typically use CPUs to process stream data.

SUMMARY

In general, this disclosure describes a new processing architecture that utilizes a data processing unit (DPU). Unlike conventional compute models that are centered around a central processing unit (CPU), example implementations described herein leverage a DPU that is specially designed and optimized for a data-centric computing model in which the data processing tasks are centered around, and the primary responsibility of, the DPU. For example, various data processing tasks, such as networking, security, storage, and analytics, as well as related work acceleration, distribution and scheduling, and other such tasks are the domain of the DPU. The DPU may be viewed as a highly programmable, high-performance input/output (I/O) and data-processing hub designed to aggregate and process network and storage I/O to and from multiple other components and/or devices. This frees resources of the CPU, if present, for computing-intensive tasks.

The highly programmable DPU comprises a network interface to connect to a network to send and receive stream data units (e.g., data packets), one or more host interfaces to connect to one or more application processors (e.g., a CPU) or storage devices to send and receive stream data units, and a multi-core processor with two or more of the processing cores executing a run-to-completion data plane operating system on which a software function is invoked for processing one or more of the stream data units, and with one or more of the processing cores executing a multi-tasking control plane operating system. The data plane operating system comprises a low level, run-to-completion operating system running on bare metal of the DPU that is configured to support software functions for performing data processing tasks. In some examples, the data plane operating system is also configured to support a control plane software stack that includes the multi-tasking control plane operating system. The DPU utilizes fine-grain work units, work unit queues, and a queue manager executed on the data plane operating system of each processing core to serialize packet processing such that data packets of a same packet flow are processed by a same processing core. In this way, the DPU is capable of processing any type of packet flow with fine granularity between processing cores and low processing overhead.

In one example, this disclosure is directed to a DPU integrated circuit comprising a network interface configured to send and receive stream data units with a network; a host interface configured to send and receive stream data units with an application processor or a storage device; a plurality of programmable processing cores; a run-to-completion data plane operating system executing on two or more of the plurality of programmable processing cores; a run-to-completion software function invoked on the data plane operating system on one of the plurality of programmable processing cores to process a work unit, wherein the work unit is associated with one or more of the stream data units, and wherein the work unit specifies the software function for processing the one or more of the stream data units and further specifies the one of the plurality of programmable processing cores for executing the software function; and a multi-tasking control plane operating system executing on one or more of the plurality of programmable processing cores.

In another example, this disclosure is directed to a system comprising a network, at least one of an application processor or a storage device, and a DPU integrated circuit. The DPU integrated circuit comprises a network interface configured to send and receive stream data units with the network; a host interface configured to send and receive stream data units with the at least one of the application processor or the storage device; a plurality of programmable processing cores; a run-to-completion data plane operating system executing on two or more of the plurality of programmable processing cores; a run-to-completion software function invoked on the data plane operating system on one of the plurality of programmable processing cores to process a work unit, wherein the work unit is associated with one or more of the stream data units, and wherein the work unit specifies the software function for processing the one or more of the stream data units and further specifies the one of the plurality of programmable processing cores for executing the software function; and a multi-tasking control plane operating system executing on one or more of the plurality of programmable processing cores.

The details of one or more examples are set forth in the accompanying drawings and the description below. Other features, objects, and advantages will be apparent from the description and drawings, and from the claims.

DETAILED DESCRIPTION

Figure 1A:
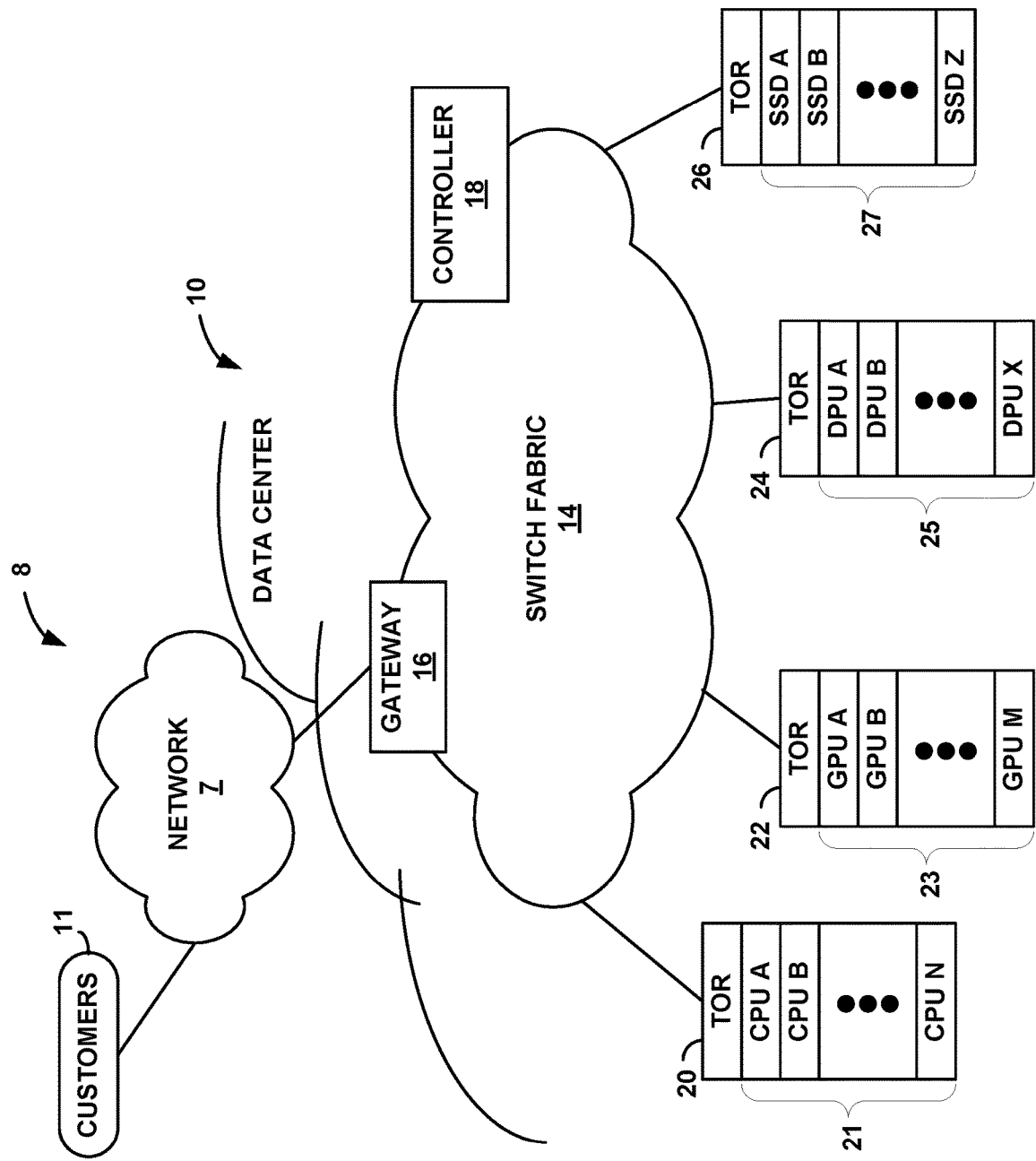
FIGS. 1A-1D are block diagrams illustrating various example implementations of nodes including a data processing unit configured according to the techniques of this disclosure.

FIGS. 1A-1D are block diagrams illustrating example implementations of nodes including a data processing unit configured according to the techniques of this disclosure. In particular, FIG. 1A is a block diagram illustrating an example system 8 having a data center 10 including racks of various nodes, such as compute nodes and storage nodes, in which one or more of the nodes include a data processing unit configured according to the techniques of this disclosure. In general, data center 10 provides an operating environment for applications and services for customers 11 coupled to data center 10 by network 7 and gateway device 16. In some examples, network 7 may be a content/service provider network. In other examples, network 7 may be a data center wide-area network (DC WAN), private network or other type of network. Data center 10 may, for example, host infrastructure equipment, such as compute nodes, networking and storage systems, redundant power supplies, and environmental controls. Network 7 may be coupled to one or more networks administered by other providers and may thus form part of a large-scale public network infrastructure, e.g., the Internet.

In some examples, data center 10 may represent one of many geographically distributed network data centers. In the example of FIG. 1A, data center 10 is a facility that provides information services for customers 11. Customers 11 may be collective entities such as enterprises and governments, or individuals. For example, a network data center may host web services for several enterprises and end users. Other exemplary services may include data storage, virtual private networks, file storage services, data mining services, scientific- or super-computing services, and so on.

This disclosure describes a new processing architecture in which a data processing unit (DPU) is utilized within one or more nodes. Unlike conventional compute models that are centered around a central processing unit (CPU), example implementations described herein leverage a DPU that is specially designed and optimized for a data-centric computing model in which the data processing tasks are centered around, and the primary responsibility of the DPU. The DPU may be viewed as a highly programmable, high-performance input/output (I/O) and data-processing hub designed to aggregate and process network and storage I/O to and from multiple other components and/or devices.

In accordance with the techniques of this disclosure, the highly programmable DPU comprises a network interface (e.g., Ethernet) to connect to a network to send and receive stream data units (e.g., data packets), one or more host interfaces (e.g., Peripheral Component Interconnect-Express (PCI-e)) to connect to one or more application processors (e.g., a CPU or a graphics processing unit (GPU)) or storage devices (e.g., solid state drives (SSDs)) to send and receive stream data units, and a multi-core processor with two or more of the processing cores executing a run-to-completion data plane operating system on which a software function is invoked for processing one or more of the stream data units, and with one or more of the processing cores executing a multi-tasking control plane operating system. The data plane operating system comprises a low level, run-to-completion operating system running on bare metal of the DPU that is configured to support software functions for performing data processing tasks. In some examples, the data plane operating system is also configured to support a control plane software stack that includes the multi-tasking control plane operating system (e.g., Linux). The DPU utilizes fine-grain work units, work unit queues, and a queue manager executed on the data plane operating system to serialize packet processing such that data packets of a same packet flow are processed by a same processing core. In this way, the DPU is capable of processing any type of packet flow with fine granularity between processing cores and low processing overhead.

In the illustrated example of FIG. 1A, data center 10 includes a number of racks hosting various types of devices that provide an operational environment for hosting cloud services. In this example, data center 10 includes a central processing unit (CPU) rack 20, a graphics processing unit (GPU) rack 22, a data processing unit (DPU) rack 24, and a solid state drive (SSD) storage device rack 26. Although only one rack of each type is illustrated in FIG. 1A, it is understood that in other examples data center 10 may include a set, i.e., two or more, of each type of rack.

In accordance with the techniques described in this disclosure, one or more of the devices held in CPU rack 20, GPU rack 22, and/or DPU rack 24 may include DPUs. These DPUs, for example, may be responsible for various data processing tasks, such as networking, security, storage, and analytics, as well as related work acceleration, distribution and scheduling, and other such tasks. In some cases, the DPUs may be used in conjunction with application processors (e.g., a separate processing device, server, storage device or even a local CPU and/or local graphics processing unit (GPU) of the compute node hosting the DPU) to offload any data-processing intensive tasks and free the application processors for computing-intensive tasks. In other cases, where control plane tasks are relatively minor compared to the data-processing intensive tasks, the DPUs may take the place of the application processors.

For example, as further explained below, CPU rack 20 hosts a number of CPU blades 21 or other compute nodes that are designed for providing a high-speed execution environment. That is, each CPU blade may contain a number of multi-core processors specially tailored to provide high-performance application execution. Similarly, GPU rack 22 may host a number of GPU blades 23 or other compute nodes that are designed to operate under the direction of a CPU or a DPU for performing complex mathematical and graphical operations better suited for GPUs. SSD rack 26 may host a number of SSD blades 27 or other storage nodes that contain permanent storage devices designed for storage and retrieval of data.

In general, in accordance with the techniques described herein, various compute nodes within data center 10, such as any of CPU blades 21, GPU blades 23, and DPU blades 25, may include DPUs to perform data centric tasks within data center 10. In addition, various storage nodes within data center 10, such as any of SSD blades 27, may interact with DPUs within CPU blades 21, GPU blades 23, or DPU blades 25 to store data for the data centric tasks performed by the DPUs. As described herein, the DPU is optimized to perform input and output (I/O) tasks, such as storage and retrieval of data to and from storage devices (such as SSDs), networking, and the like. For example, the DPU may be configured to execute a large number of data I/O processing tasks relative to a number of instructions that are processed. The DPU may support one or more host interfaces, such as PCI-e ports. The DPU may support one or more high-speed network interfaces, such as Ethernet ports, without the need for a separate network interface card (NIC), and may include programmable hardware specialized for network traffic. The DPU may be highly programmable such that the DPU may expose hardware primitives for selecting and programmatically configuring data processing operations. The DPU may be optimized for these processing tasks as well. For example, the DPU may include hardware implementations of high-performance data processing tasks, such as cryptography, compression (and decompression), regular expression processing, lookup engines, or the like.

In the example shown in FIG. 1A, the set of racks 20, 22, 24, and 26 are connected to a high-speed switch fabric 14 via Ethernet links. Each of the racks holds a plurality of devices that may be interconnected within their respective racks via PCI-e links and/or Ethernet links. In addition, the devices included in the different racks 20, 22, 24, and 26 may be interconnected via PCI-e links and/or Ethernet links. In some examples, each of racks 20, 22, 24, and 26 may be a physical equipment rack having forty rack units (e.g., slots) in which to hold devices. In other examples, each of racks 20, 22, 24, and 26 may be logical racks or half-physical racks having twenty rack units. Each of the devices may be implemented as single- or multi-rack unit (RU) devices.

One or more of the devices in the different racks 20, 22, 24, or 26 may be configured to operate as storage systems and application servers for data center 10. For example, CPU rack 20 holds a plurality of CPU blades ("CPUs A-N") 21 that each includes at least a CPU. One or more of CPU blades 21 may include a CPU, a DPU, and one or more storage devices, e.g., SSDs, communicatively coupled via PCI-e links or buses. In this implementation, the DPU is configured to retrieve data from the storage devices on behalf of the CPU, store data to the storage devices on behalf of the CPU, and retrieve data from network 7 and/or switch fabric 14 on behalf of the CPU. One or more of CPU blades 21 may also include a GPU communicatively coupled to at least the DPU. In this case, the DPU is also configured to send offloaded processing tasks (e.g., graphics intensive processing tasks, or other tasks that may benefit from the highly parallel processing nature of a graphics processing unit) to the GPU. An example implementation of one of CPU blades 21 is described in more detail below with respect to compute node 30A of FIG. 1B.

In some examples, at least some of CPU blades 21 may not include their own DPUs, but instead are communicatively coupled to a DPU on another one of CPU blades 21. In other words, one DPU may be configured to control I/O and other data processing tasks for two or more CPUs on different ones of CPU blades 21. In still other examples, at least some of CPU blades 21 may not include their own DPUs, but instead are communicatively coupled to a DPU on one of DPU blades 25 held in DPU rack 24.

As another example, GPU rack 22 holds a plurality of GPU blades ("GPUs A-M") 23 that each includes at least a GPU. One or more of GPU blades 23 may include a GPU, a DPU, and one or more storage devices, e.g., SSDs, communicatively coupled via PCI-e links or buses. In this implementation, the DPU is configured to control input and output of data with network 7 and/or switch fabric 14, feed the data from at least one of network 7, switch fabric 14, or the storage devices to the GPU for processing, and control storage of the data with the storage devices. An example implementation of one of GPU blades 23 is described in more detail below with respect to compute node 30B of FIG. 1C.

In some examples, at least some of GPU blades 23 may not include their own DPUs, but instead are communicatively coupled to a DPU on another one of GPU blades 23. In other words, one DPU may be configured to control I/O tasks to feed data to two or more GPUs on different ones of GPU blades 23. In still other examples, at least some of GPU blades 23 may not include their own DPUs, but instead are communicatively coupled to a DPU on one of DPU blades 25 held in DPU rack 24.

As a further example, DPU rack 24 holds a plurality of DPU blades ("DPUs A-X") 25 that each includes at least a DPU. One or more of DPU blades 25 may include a DPU and one or more storage devices, e.g., SSDs, communicatively coupled via PCI-e links or buses such that DPU blades 25 may alternatively be referred to as "storage blades." In this implementation, the DPU is configured to control input and output of data with network 7 and/or switch fabric 14, perform programmable processing tasks on the data, and control storage of the data with the storage devices. An example implementation of one of DPU blades 25 is described in more detail below with respect to storage node 33 of FIG. 1D.

As illustrated in FIG. 1A, data center 10 may also include at least one separate, stand-alone, SSD rack 26 that holds a plurality of SSD blades ("SSDs A-Z") 27 that each includes at least one SSD device. The majority of SSD blades 27 do not include their own processors, e.g., no CPUs or DPUs are included on most of SSD blades 27. Instead, in one example, one of SSD blades 27 may include one or more DPUs that are communicatively coupled to each of the plurality of other SSD blades 27. In other examples, SSD rack 26 may include a DPU blade that includes one or more DPUs that are communicatively coupled to each of the plurality of SSD blades 27, or one or more DPUs on DPU blades 25 held in DPU rack 24 may be communicatively coupled to the plurality of SSD blades 27 held in SSD rack 26. In any implementation, the DPUs are configured to control input and output of data with network 7 and/or switch fabric 14, control input and output of data with application processors (e.g., CPUs on CPU blades 21 or GPUs on GPU blades 23), perform programmable processing tasks on the data, and control storage of the data with the SSDs on SSD blades 27. In this way, the scalability of storage is not tied to the scalability of processing in data center 10. Although illustrated in FIG. 1A as only including SSDs as storage devices for data center 10, in other examples, data center 10 may include one or more racks holding hard drive (HD) storage devices or a combination of SSD and HD storage devices.

In general, DPUs may be included on or communicatively coupled to any of CPU blades 21, GPU blades 23, DPU blades 25, and/or SSD blades 27 to provide computation services and storage facilities for applications and data associated with customers 11. In this way, the DPU may be viewed as a building block for building and scaling out data centers, such as data center 10.

In the illustrated example of FIG. 1A, each of racks 20, 22, 24, and 26 may include a top of rack (TOR) device through which each of the blades held in the physical rack may connect to switch fabric 14 via Ethernet links. In other examples, one or more of the physical racks may not include a TOR device and may instead connect directly to switch fabric 14 or connect to switch fabric 14 via another device that is not held in the physical rack itself. For example, DPU rack 24 may not include the illustrated TOR device, and instead each of the DPUs in DPU blades 25 may support a network interface through which to connect to switch fabric 14 directly via Ethernet links.

The DPUs or any of the devices within racks 20, 22, 24, and 26 that include at least one DPU may also be referred to as access nodes. In other words, the term DPU may be used herein interchangeably with the term access node. As access nodes, the DPUs may utilize switch fabric 14 to provide full mesh (any-to-any) interconnectivity such that any of the devices in racks 20, 22, 24, 26 may communicate stream data (e.g., data packets of a given packet flow) to any other of the devices using any of a number of parallel data paths within the data center 10. For example, the DPUs may be configured to spray individual packets for packet flows between the DPUs and across some or all of the multiple parallel data paths in the data center switch fabric 14 and reorder the packets for delivery to the destinations so as to provide full mesh connectivity.

Although racks 20, 22, 24, and 26 are described in FIG. 1 with respect to switch fabric 14 of data center 10, in other examples, the DPUs of the devices within racks 20, 22, 24, 26 may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the DPUs. The packet switched network may use any technology, including IP over Ethernet as well as other technologies. Irrespective of the type of packet switched network, the DPUs may spray individual data packets of packet flows between the DPUs and across multiple parallel data paths in the packet switched network and reorder the packets for delivery to the destinations so as to provide full mesh connectivity.

Additional example details of various example access nodes are described in U.S. Provisional Patent Application No. 62/559,021, filed Sep. 15, 2017, entitled "Access Node for Data Centers," the entire content of which is incorporated herein by reference. More details on data center network architectures and interconnected access nodes are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

A new data transmission protocol referred to as a Fabric Control Protocol (FCP) may be used by the different operational networking components of any of the DPUs of the devices within racks 20, 22, 24, 26 to facilitate communication of data across switch fabric 14. FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of stream data units (e.g., data packets of a packet flow) to all paths between a source and a destination node, and may provide resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

In the example of FIG. 1A, a software-defined networking (SDN) controller 18 provides a high-level controller for configuring and managing the routing and switching infrastructure of data center 10. SDN controller 18 provides a logically and in some cases physically centralized controller for facilitating operation of one or more virtual networks within data center 10 in accordance with one or more embodiments of this disclosure. In some examples, SDN controller 18 may operate in response to configuration input received from a network administrator.

In some examples, SDN controller 18 operates to configure the DPUs of the devices within racks 20, 22, 24, 26 to logically establish one or more virtual fabrics as overlay networks dynamically configured on top of the physical underlay network provided by switch fabric 14. For example, SDN controller 18 may learn and maintain knowledge of the DPUs and establish a communication control channel with each of the DPUs. SDN controller 18 uses its knowledge of the DPUs to define multiple sets (groups) of two of more DPUs to establish different virtual fabrics over switch fabric 14. More specifically, SDN controller 18 may use the communication control channels to notify each of the DPUs for a given set which other DPUs are included in the same set. In response, the DPUs dynamically setup FCP tunnels with the other DPUs included in the same set as a virtual fabric over switch fabric 14. In this way, SDN controller 18 defines the sets of DPUs for each of the virtual fabrics, and the DPUs are responsible for establishing the virtual fabrics. As such, underlay components of switch fabric 14 may be unaware of virtual fabrics. In these examples, the DPUs interface with and utilize switch fabric 14 so as to provide full mesh (any-to-any) interconnectivity between DPUs of any given virtual fabric. In this way, the devices within racks 20, 22, 24, 26 connected to any of the DPUs forming a given one of virtual fabrics may communicate stream data units (e.g., data packets of a given packet flow) to any other of the devices within racks 20, 22, 24, 26 coupled to the DPUs for that virtual fabric using any of a number of parallel data paths within switch fabric 14 that interconnect the DPUs of that virtual fabric. More details of DPUs or access nodes operating to spray stream data units within and across virtual overlay networks are available in U.S. Provisional Patent Application No. 62/638,788, filed Mar. 5, 2018, entitled "Network Access Node Virtual Fabrics Configured Dynamically over an Underlay Network," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Figure 1B:
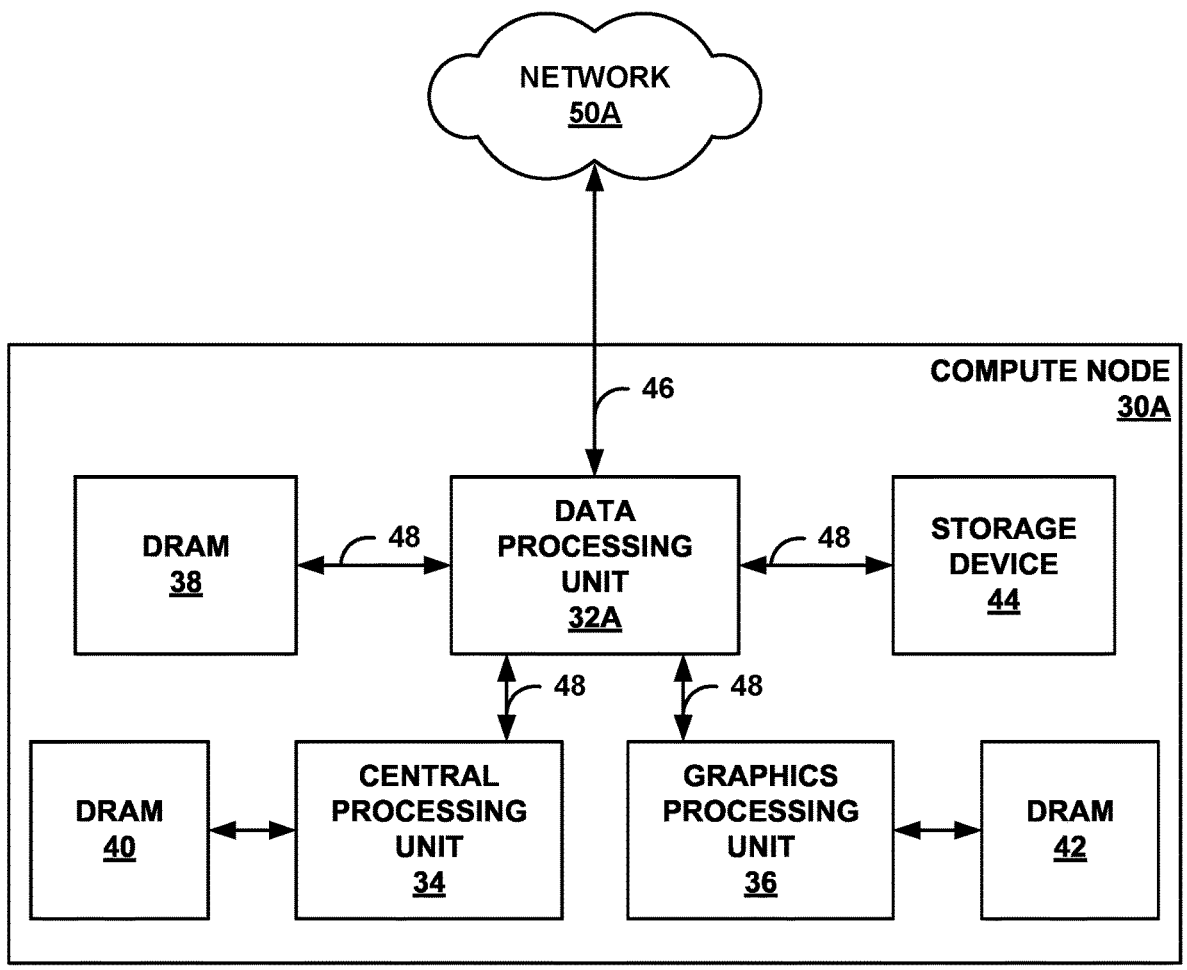

FIG. 1B is a block diagram illustrating an example compute node 30A (e.g., a computing device or compute appliance) including a data processing unit 32A configured according to the techniques of this disclosure and communicatively coupled to a central processing unit 34. Compute node 30A may represent a workstation computer, a server device, or the like. Compute node 30A may represent a server device of a plurality of server devices forming a data center. For example, compute node 30A may include at least one CPU, at least one DPU, at least one GPU, and at least one storage device, e.g., SSD. As another example, with respect to FIG. 1A, compute node 30A may represent at least one of CPU blades 21, or a combination of at least one of CPU blades 21, at least one of GPU blades 23, and at least one of DPU blades 25 of FIG. 1A that are communicatively coupled together.

In the example of FIG. 1B, compute node 30A includes DPU 32A, CPU 34, GPU 36, dynamic random access memory (DRAM) 38, 40, 42, and storage device 44, such as SSDs, Flash drives, disk drives, and the like. DPU 32A is coupled to CPU 34, GPU 36, DRAM 38, and storage device 44 via host interfaces, Peripheral Component Interconnect-Express (PCI-e) buses 48 in this example. DPU 32A also acts as a network interface for compute node 30A to network 50A, which may represent the Internet. Network 50A may be substantially similar to network 7 and/or switch fabric 14 from FIG. 1A. DPU 32A is coupled to a device (e.g., a provider edge router of network 50A, not shown) to access network 50A via Ethernet link 46, in this example. DPU 32A is positioned between and communicatively coupled to CPU 34, storage device 44, and GPU 36. Although only one storage device 44 is shown, it should be understood that multiple such storage devices may be included within or coupled to compute node 30A (and DPU 32A may be coupled to each of the storage devices, e.g., via PCI-e buses).

DPU 32A may be configured according to the various techniques of this disclosure. DPU 32A is a highly programmable I/O processor with a plurality of processing cores (as discussed below, e.g., with respect to FIG. 3). Two or more of the processing cores execute a run-to-completion data plane operating system configured to support software functions for performing data processing tasks on behalf of CPU 34, and one or more of the processing cores execute a multi-tasking control plane operating system (as discussed below, e.g., with respect to FIG. 2). In addition, the multi-core processor is equipped with hardware engines that allow CPU 34 to offload various processes, such as cryptographic functions, compression, and regular expression processing. DPU 32A is a network interface subsystem that can form a nexus between various components and devices, e.g., CPU 34, GPU 36, storage device 44, and network devices of network 50A.

In the example of FIG. 1B, DPU 32A provides access between network 50A, storage device 44, GPU 36, and CPU 34. In other examples, a DPU such as DPU 32A may aggregate and process network and SSD I/O to multiple server devices including application processors. In this manner, DPU 32A is configured to retrieve data from storage device 44 on behalf of CPU 34, store data to storage device 44 on behalf of CPU 34, and retrieve data from network 50A on behalf of CPU 34. Furthermore, DPU 32A is also configured to send offloaded processing tasks (e.g., graphics intensive processing tasks, or other tasks that may benefit from the highly parallel processing nature of a graphics processing unit) to GPU 36, to receive output for the offloaded processing tasks from GPU 36, and to provide the output for the offloaded processing tasks to CPU 34.

In general, software programs executable on CPU 34 can perform instructions to offload some or all data-intensive processing tasks associated with the software program to DPU 32A. Each of the processing cores of DPU 32A may be programmable using a high-level programming language, e.g., C, C++, or the like. In general, the various hardware implementations of processes provided by DPU 32A may be associated with software libraries in the high-level programming language that may be utilized to construct software applications for execution by CPU 34 that, by way of the host interfaces, invoke and leverage the functionality of DPU 32A. Thus, a programmer can write a software program in the programming language and use function or procedure calls associated with the hardware implementations of various processes of DPU 32A to perform these functions, and when CPU 34 executes the software program, CPU 34 offloads performance of these functions/procedures to DPU 32A.

Additionally, or alternatively, CPU 34 may offload other software procedures or functions to DPU 32A to be executed by processing cores of DPU 32A. Furthermore, CPU 34 may offload software procedures or functions to GPU 36 via DPU 32A (e.g., computer graphics processes). In this manner, DPU 32A represents a dynamically programmable processing unit that can execute software instructions, as well as provide hardware implementations of various procedures or functions for data-processing tasks, which may improve performance of these procedures or functions.

Figure 1C:
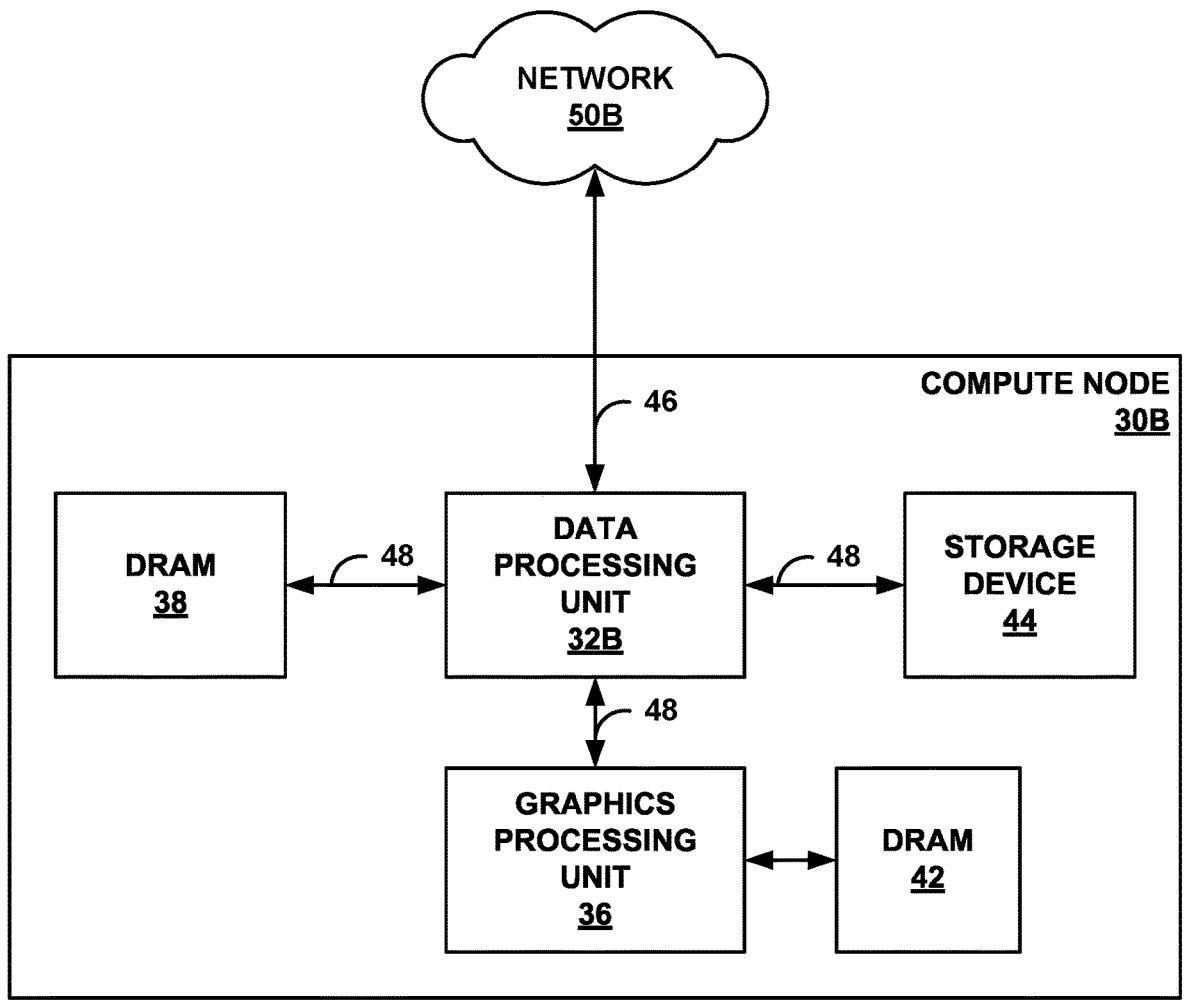

FIG. 1C is a block diagram illustrating another example compute node 30B (e.g., computing device or compute appliance) including a DPU 32B configured according to the techniques of this disclosure and communicatively coupled to a GPU 36. Compute node 30B may represent a workstation computer, a server device, or the like. Compute node 30B may represent a server device of a plurality of server devices forming a data center. For example, compute node 30B may include at least one DPU, at least one GPU, and at least one storage device, e.g., SSD. As another example, with respect to FIG. 1A, compute node 30B may represent at least one of GPU blades 23, or a combination of at least one of GPU blades 23 and at least one of DPU blades 25 that are communicatively coupled together.

In the example of FIG. 1C, compute node 30B includes DPU 32B, GPU 36, DRAM 38, 42, and storage device 44, such as SSDs, Flash drives, disk drives, and the like. DPU 32B is coupled to GPU 36, DRAM 38, and storage device 44 via host interfaces, PCI-e buses 48 in this example. DPU 32B also acts as a network interface for compute node 30B to network 50B, which may represent the Internet. Network 50B may be substantially similar to network 7 and/or switch fabric 14 from FIG. 1A. DPU 32B is coupled to a device (e.g., a provider edge router of network 50B, not shown) to access network 50B via Ethernet link 46, in this example. DPU 32B is positioned between and communicatively coupled to storage device 44 and GPU 36. Although only one storage device 44 is shown, it should be understood that multiple such storage devices may be included within or coupled to compute node 30B (and DPU 32B may be coupled to each of the storage devices, e.g., via PCI-e buses).

DPU 32B may be configured according to the various techniques of this disclosure. DPU 32B may operate substantially similar to DPU 32A described above with respect to FIG. 1B. DPU 32B is a highly programmable I/O processor with a plurality of processing cores (as discussed below, e.g., with respect to FIG. 3). Two or more of the processing cores execute a run-to-completion data plane operating system configured to support software functions for performing data processing tasks, and one or more of the processing cores execute a multi-tasking control plane operating system (as discussed below, e.g., with respect to FIG. 2). The multi-core processor is also equipped with specific hardware units configured specifically to implement various data-intensive operations. DPU 32B is a network interface subsystem that can form a nexus between various components and devices, e.g., storage device 44, GPU 36, and network devices of network 50B.

In the example of FIG. 1C, DPU 32B provides access between network 50B, storage device 44, and GPU 36. In other examples, a DPU such as DPU 32B may aggregate and process network and SSD I/O to multiple server devices including application processors. DPU 32B may operate as a control plane (e.g., essentially a CPU) for compute node 30B to facilitate data processing by GPU 36. In this manner, DPU 32B is configured to control input and output of data with network 50B. Furthermore, DPU 32B is also configured to feed data from at least one of network 50B or storage device 44 to GPU 36 for processing (e.g., graphics intensive processing, or other processing tasks that may benefit from the highly parallel processing nature of a graphics processing unit), and receive output of the processing from GPU 36. DPU 32B is further configured to control storage of data that is received from network 50B and/or processed by either DPU 32B or GPU 36 with storage device 44.

As an example, in the case of artificial intelligence (AI) processing, control plane functions include executing control tasks to instruct a GPU to perform certain types of computationally intensive processing, and executing I/O tasks to feed a large amount of data to the GPU for processing. In general, I/O processing tasks that control data movement between GPUs and storage devices are more important for facilitating AI processing than the relatively minor control tasks. Therefore, in the example of AI processing, it makes sense to use DPU 32B in place of a CPU. In the example of FIG. 1C, DPU 32B instructs GPU 36 to perform matrix/linear algebra on data from network 50B or storage device 44, and feeds data to and from GPU 36.

Figure 1D:
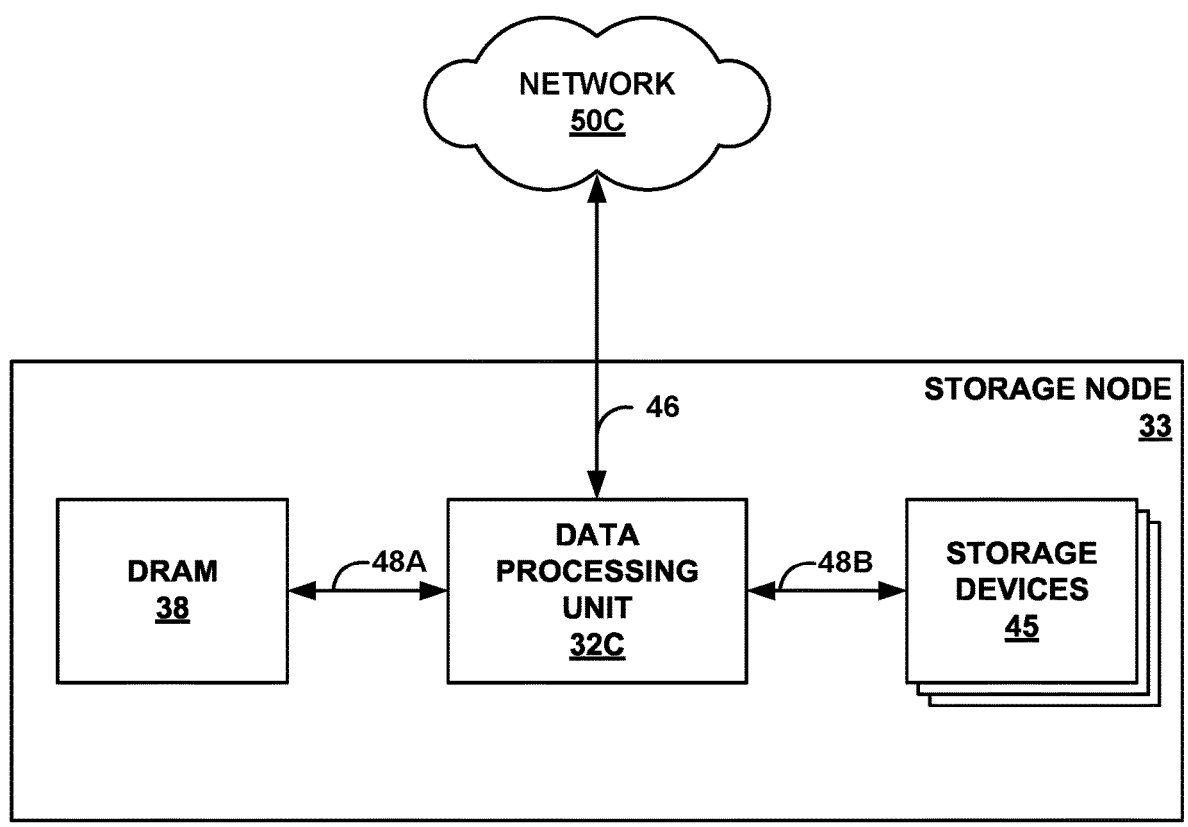

FIG. 1D is a block diagram illustrating an example storage node 33 including a data processing unit 32C configured according to the techniques of this disclosure and communicatively coupled to one or more storage devices 45, such as SSDs, Flash drives, disk drives, and the like. In this example, storage node 33 may represent a storage appliance, a storage server, or storage controller, and may be coupled to a set, rack, or cluster of storage devices 45, which may be internal or external to storage node 33, or combinations thereof. In this application, DPU 32C provides high-performance processing of streams of data units read from and written to storage devices 45, and provides a direct network interface to network 50C for those streams of data units. As such, DPU 32C may be viewed as a specialized frontend for network accessible storage devices 45 that provides an enhanced execution environment for stream processing of the data read from and written to storage devices 45 from compute nodes, other storage nodes or other devices coupled to network 50C.

As shown, in this example, storage node 33 may include at least one DPU and at least one storage device, e.g., SSD. As another example, with respect to FIG. 1A, storage node 33 may represent at least one of DPU blades 25, or a combination of at least one of DPU blades 25 and one or more SSD blades 27 or other storage devices that are communicatively coupled together.

In the example of FIG. 1D, storage node 33 includes DPU 32C, DRAM 38, and a plurality of storage devices 45. DPU 32C is coupled to DRAM 38 and storage devices 45 via host interfaces, PCI-e buses 48A, 48B in this example. PCI-e interface 48B may, in some examples, be processed by one or more intermediate components to translate the PCI-e interface into other storage protocols, such as SAS or SATA (Serial AT Attachment), as examples. DPU 32C also acts as a network interface for storage node 33 to network 50C, which may represent the Internet. Network 50C may be substantially similar to network 7 and/or switch fabric 14 from FIG. 1A. DPU 32C may be coupled to a device (e.g., a provider edge router of network 50C, not shown) to access network 50C via Ethernet link 46, in this example.

DPU 32C may be configured according to the various techniques of this disclosure. DPU 32C may operate substantially similar to DPU 32A of FIG. 1B or DPU 32B of FIG. 1C. DPU 32C is a highly programmable I/O processor with a plurality of processing cores (as discussed below, e.g., with respect to FIG. 3). Two or more of the processing cores execute a run-to-completion data plane operating system configured to support software functions for performing data processing tasks, and one or more of the processing cores execute a multi-tasking control plane operating system (as discussed below, e.g., with respect to FIG. 2). The multi-core processor is also equipped with specific hardware units configured specifically to implement various data-intensive operations. DPU 32C is a network interface subsystem that can form a nexus between various components and devices, e.g., storage devices 45 and network devices of network 50C.

In the example of FIG. 1D, DPU 32C provides access between network 50C and storage devices 45. In other examples, a DPU such as DPU 32C may aggregate and process network and SSD I/O to multiple server devices including application processors. DPU 32C may operate as a control plane (e.g., essentially a CPU) for storage node 33 to facilitate data storage and retrieval from storage devices 45. In this manner, DPU 32C is configured to control input and output of data with network 50C. Furthermore, DPU 32C is also configured to perform programmable processing tasks on data that is received from network 50C or retrieved from storage devices 45. DPU 32C is further configured to control storage of data that is received from network 50C and/or processed by DPU 50C with storage devices 45. In one example, storage devices 45 may comprise an entire rack of SSD blades that each include at least one SSD device, e.g., SSD rack 26 of FIG. 1A. In this example, the I/O processing tasks to control data movement between the network and the SSDs are more important than the relatively minor control tasks associated with data storage. Therefore, in the example of storage management, it makes sense to use DPU 32C in place of a CPU.

Additional example details of various example DPUs are described in U.S. Provisional Patent Application No. 62/530,691, filed Jul. 10, 2017, entitled "Data Processing Unit for Computing Devices," the entire content of which is incorporated herein by reference.

Example hardware and software architecture of a DPU are described below with respect to FIG. 2 and FIG. 3. The hardware and software architectures of the DPU are optimized for high performance and high efficiency stream processing. A stream is defined as an ordered, unidirectional sequence of computational objects (referred to herein as stream data units generally or, as a specific example, data packets of a packet flow) that can be of unbounded or undetermined length. In a simple example, a stream originates in a producer and terminates at a consumer, and is operated on sequentially. In some examples, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. Independent of the stream type, stream manipulation requires efficient fragment manipulation.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within a DPU can safely access different windows within the stream.

As described herein, processing of stream information may be associated with a "work unit." A work unit (WU) is a container that is associated with a stream state and used to describe (i.e. point to) data within a stream (stored in memory) along with any associated meta-data and operations to be performed on the data. Work units may dynamically originate within a peripheral unit of a DPU (e.g. injected by a networking unit, a host unit, or a storage device interface) or within a processor of the DPU in association with one or more streams of data, and terminate at another peripheral unit or another processor of the DPU. Stream processing is typically initiated as a result of receiving one or more work units associated with respective portions of the stream, e.g., one or more stream data units or data packets of a packet flow.

A work unit may represent a fixed length data structure including an action value and one or more arguments. In one example, a work unit includes four words, a first word having a value representing an action value and three additional words each representing an argument. The action value may be considered a work unit header containing information necessary for message delivery and information used for work unit execution. More specifically, the action value of a work unit specifies a software function (also referred to as an event handler or work unit (WU) handler) for processing the one or more stream data units associated with the work unit, and specifies source and destination processing core for executing the software function. The other arguments of the work unit data structure may include a frame argument having a value acting as a pointer to a continuation work unit to invoke a subsequent WU handler, a flow argument having a value acting as a pointer to state that is relevant to the WU handler, and a stream data unit argument having a value acting as a pointer to the associated stream data units.

A data structure referred to as a work unit (WU) stack may be used in the multi-core processor system of the DPU to more readily manage and utilize an event driven, run-to-completion programming model of an operating system executed by the DPU. The WU data structure is a building block in the WU stack and can readily be used to compose a processing pipeline and services execution in the multi-core processor system of the DPU. The WU stack structure carries state, memory, and other information in auxiliary variables external to the program stack for any given processor core.

More details on work units, work unit stacks, and stream processing by data processing units are available in U.S. Provisional Patent Application No. 62/589,427, filed Nov. 21, 2017, entitled "Work Unit Stack Data Structures in Multiple Core Processor System," and U.S. patent application Ser. No. 15/949,692, entitled "Efficient Work Unit Processing in a Multicore System," filed Apr. 10, 2018, the entire content of each of which is incorporated herein by reference.

Figure 2:
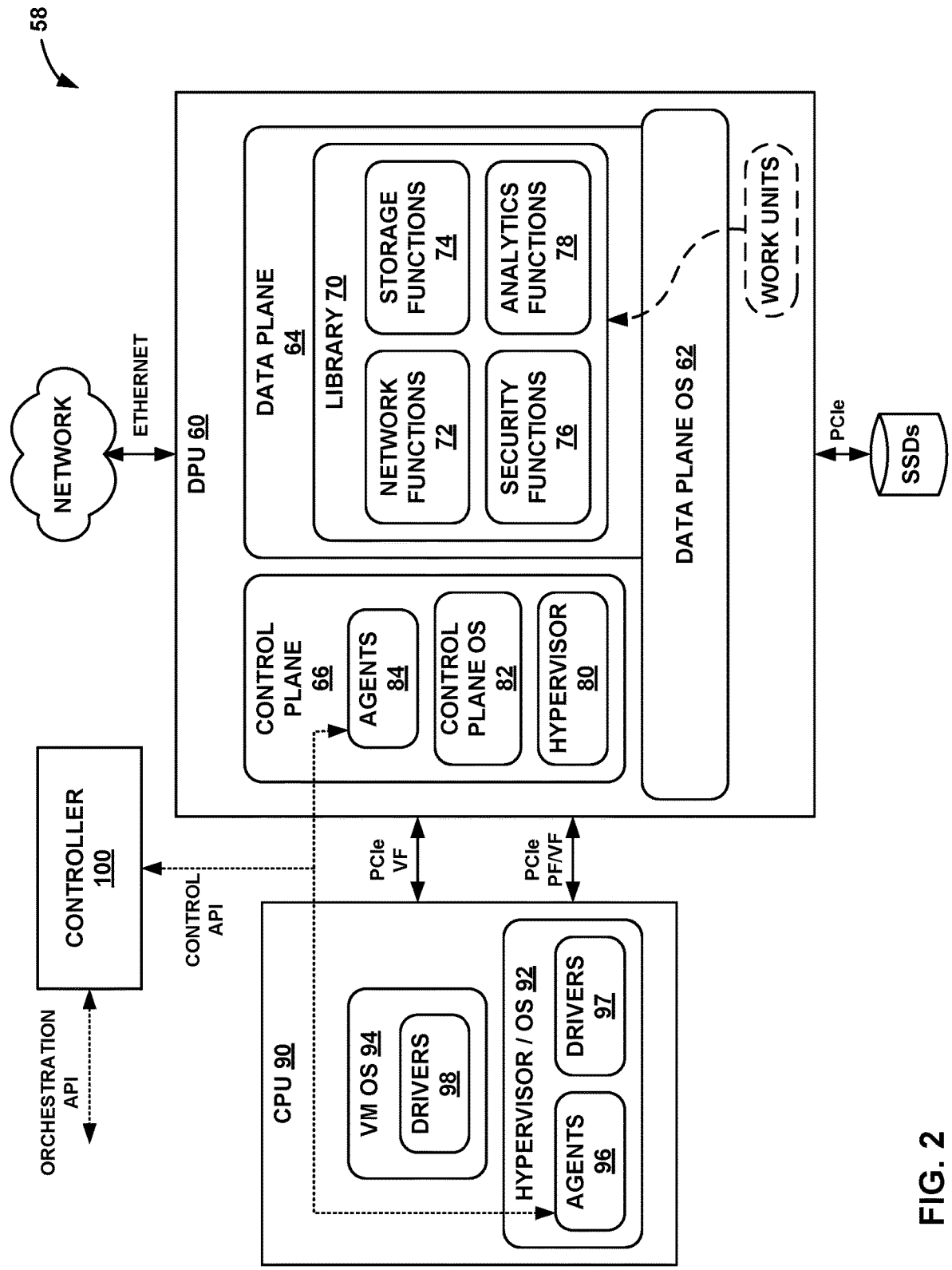
FIG. 2 is a block diagram illustrating a system having an example data processing unit including a run-to-completion data plane operating system configured to process work units, in accordance with the techniques of this disclosure.

FIG. 2 is a block diagram illustrating a system 58 having a data processing unit (DPU) 60 including a run-to-completion data plane operating system (OS) 62 configured to process work units, in accordance with the techniques of this disclosure. In the illustrated example of FIG. 2, system 58 also includes CPU 90 communicatively coupled to DPU 60. Each of DPU 60 and CPU 90 generally represents a hardware chip implemented in digital logic circuitry. In some examples, DPU 60 and CPU 90 may be hosted on a same computing device such that system 58 may operate substantially similar to compute node 30A of FIG. 1B. DPU 60 may operate substantially similar to any of the DPUs of the devices within racks 20, 22, 24, or 26 of FIG. 1A. CPU 90 may operate substantially similar to any of the CPUs of the devices within rack 20 of FIG. 1A.

DPU 60 is a highly programmable I/O processor with a plurality of processing cores (as discussed below, e.g., with respect to FIG. 3). In the illustrated example of FIG. 2, DPU 60 includes a network interface (e.g., an Ethernet interface) to connect directly to a network, and a plurality of host interfaces (e.g., PCI-e interfaces) to connect directly to one or more application processors (e.g., CPU 90) and one or more storage devices (e.g., SSDs). DPU 60 also includes a run-to-completion data plane operating system (OS) 62 executing on two or more of the plurality of processing cores. Data plane OS 62 provides data plane 64 as an execution environment for a run-to-completion software function invoked on data plane OS 62 to process a work unit. As described above, the work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 70 provided by data plane OS 62. In the illustrated example, library 70 includes network functions 72, storage functions 74, security functions 76, and analytics functions 78. Network functions 72 may, for example, include network I/O data processing functions related to Ethernet, network overlays, networking protocols, encryption, and firewalls. Storage functions 74 may, for example, include storage I/O data processing functions related to NVME (non-volatile memory express), compression, encryption, replication, erasure coding, and pooling. Security functions 76 may, for example, include security data processing functions related to encryption, regular expression processing, and hash processing. Analytics functions 78 may, for example, include analytical data processing functions related to a customizable pipeline of data transformations.

In general, data plane OS 62 is a low level, run-to-completion operating system running on bare metal of DPU 62 that runs hardware threads for data processing and manages work units. As described in more detail below, data plane OS 62 includes the logic of a queue manager to manage work unit interfaces, enqueue and dequeue work units from queues, and invoke a software function specified by a work unit on a processing core specified by the work unit. In the run-to-completion programming model, data plane OS 62 is configured to dequeue a work unit from a queue, process the work unit on the processing core, and return the results of processing the work unit to the queues.

DPU 60 also includes a multi-tasking control plane operating system executing on one or more of the plurality of processing cores. In some examples, the multi-tasking control plane operating system may comprise Linux, Unix, or a special-purpose operating system. In some examples, as illustrated in FIG. 2, data plane OS 62 provides a control plane 66 including a control plane software stack executing on data plane OS 62. As illustrated, the control plane software stack includes a hypervisor 80, a multi-tasking control plane OS 82 executing on hypervisor 80, and one or more control plane service agents 84 executing on control plane OS 82. Hypervisor 80 may operate to isolate control plane OS 82 from the work unit and data processing performed on data plane OS 62. Control plane service agents 84 executing on control plane OS 82 comprise application level software configured to perform set up and tear down of software structures to support work unit processing performed by the software function executing on data plane OS 62. In the example of data packet processing, control plane service agents 84 are configured to set up the packet flow for data packet processing by the software function on data plane OS 62, and tear down the packet flow once the packet processing is complete. In this way, DPU 60 comprises a highly programmable processor that can run application level processing while leveraging the underlying work unit data structure for highly parallelized stream processing.

In another example, instead of running on top of data plane OS 62, the multi-tasking control plane operating system may run on one or more independent processing cores that are dedicated to the control plane operating system and different than the processing cores executing data plane OS 62. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

CPU 90 is an application processor with one or more processing cores optimized for computing-intensive tasks. In the illustrated example of FIG. 2, CPU 90 includes a plurality of host interfaces (e.g., PCI-e interfaces) to connect directly to DPU 60. CPU 90 includes a hypervisor/OS 92 that supports one or more service agents 96 and one or more drivers 97. As illustrated in FIG. 2, CPU 90 may also include a virtual machine (VM) OS 94 executing on top of hypervisor/OS 92 that supports one or more drivers 98. Application level software, such as agents 96 or drivers 97 executing on OS 92 or drivers 98 executing on VM OS 94, of CPU 90 may determine which data processing tasks to offload from CPU 90 to DPU 60. For example, hypervisor/OS 92 of CPU 90 may offload data processing tasks to DPU 60 using physical functions (PFs) and/or virtual functions (VFs) of PCIe links. VM OS 94 of CPU 90 may offload data processing tasks to DPU 60 using VFs of PCIe links.

In the illustrated example of FIG. 2, system 58 also includes a controller 100 in communication with both DPU 60 and CPU 90 via a control application programming interface (API). Controller 100 may provide a high-level controller for configuring and managing application level software executing on a control plane operating system of each of DPU 60 and CPU 90. For example, controller 100 may configure and manage which data processing tasks are to be offloaded from CPU 90 to DPU 60. In some examples, controller 100 may comprise a software-defined networking (SDN) controller, which may operate substantially similar to controller 18 of FIG. 1A. In some examples, controller 100 may operate in response to configuration input received from a network administrator via an orchestration API.

Data plane OS 62 of DPU 60 is configured to receive stream data units for processing on behalf of the application level software executing on hypervisor/OS 92 of CPU 90. In the example of packet processing, the stream data units may comprise data packets of packet flows. In this example, the received packet flows may include any of networking packet flows, storage packet flows, security packet flow, analytics packet flows, or any combination thereof. Data plane OS 62 executing on one of the processing cores of DPU 60 may receive each of the packet flows in the form of one or more work units from a networking unit, host unit, or another one of the processing cores (as discussed below, e.g., with respect to FIG. 3) of DPU 60. Each of the work units for a received packet flow may be associated with one or more data packets of the packet flow. Upon receipt of the packet flow, data plane OS 62 performs a lookup in a flow table to determine that the packet flow is legitimate, and maps the entire packet flow to one of the processing cores of DPU 60 for serialized processing of the packets of the packet flow. The flow table may comprise a hardware implemented flow table that is updated and maintained with legitimate packet flows by control plane 66, and used to assign processing cores to packet flows.

In the case where the received packet flow is not recognized by data plane OS 62, e.g., the packet flow is not yet set up in the flow table, data plane OS 62 may send the packet flow through the slow path in control plane 66 for set up. Control plane service agents 84 executing on control plane OS 82 then determine that the packet flow is legitimate, and send an instruction to data plane OS 62 to set up the packet flow in the flow table.

Once the packet flow is set up by control plane service agents 84, data plane OS 62 may assign the packet flow to a particular processing core of DPU 60 that can do stream processing for the packet flow. As one example, data plane OS 62 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 62 also provides interfaces to one or more hardware accelerators of DPU 62 (as discussed below, e.g., with respect to FIG. 3) configured to perform acceleration for various data processing functions. Data plane OS 62 may use the hardware accelerators to process one or more portions of the packet flow, i.e., one or more work units, arranged as a work unit (WU) stack. In the WU stack, a first work unit includes an identifier of a subsequent work unit within the WU stack for further processing of the packets upon completion of the first work unit. To perform stream processing for the packet flow, a hardware accelerator is configured to perform one or more hardware commands included in the WU stack as input parameters of the first work unit, and upon completion of the one or more hardware commands, proceed to the subsequent work unit within the WU stack identified by the first work unit.

As described herein, the DPU utilizes fine-grain work units, work unit queues, and a queue manager executed on the data plane operating system of each processing core to serialize packet processing such that data packets of a same packet flow are processed by a same processing core. In this way, the DPU is capable of processing any type of packet flow with fine granularity between processing cores and low processing overhead. For comparison, other multi-core systems may communicate using shared memory and locking to ensure coherency in memory. The locking schemes may be an order of magnitude larger grain than the work unit scheme described herein. For example, the processing overhead associated with the work unit scheme is less than 100 clock cycles. Processing overhead may include the number of cycles to implement a work unit and the number of cycles to dequeue and deploy the work unit to a given processing core for processing. Serializing packet processing on the given run-to-completion hardware thread to maintain synchronization, as described herein, results in roughly the same overhead as the locking schemes used in conventional multi-core systems.

Figure 3:
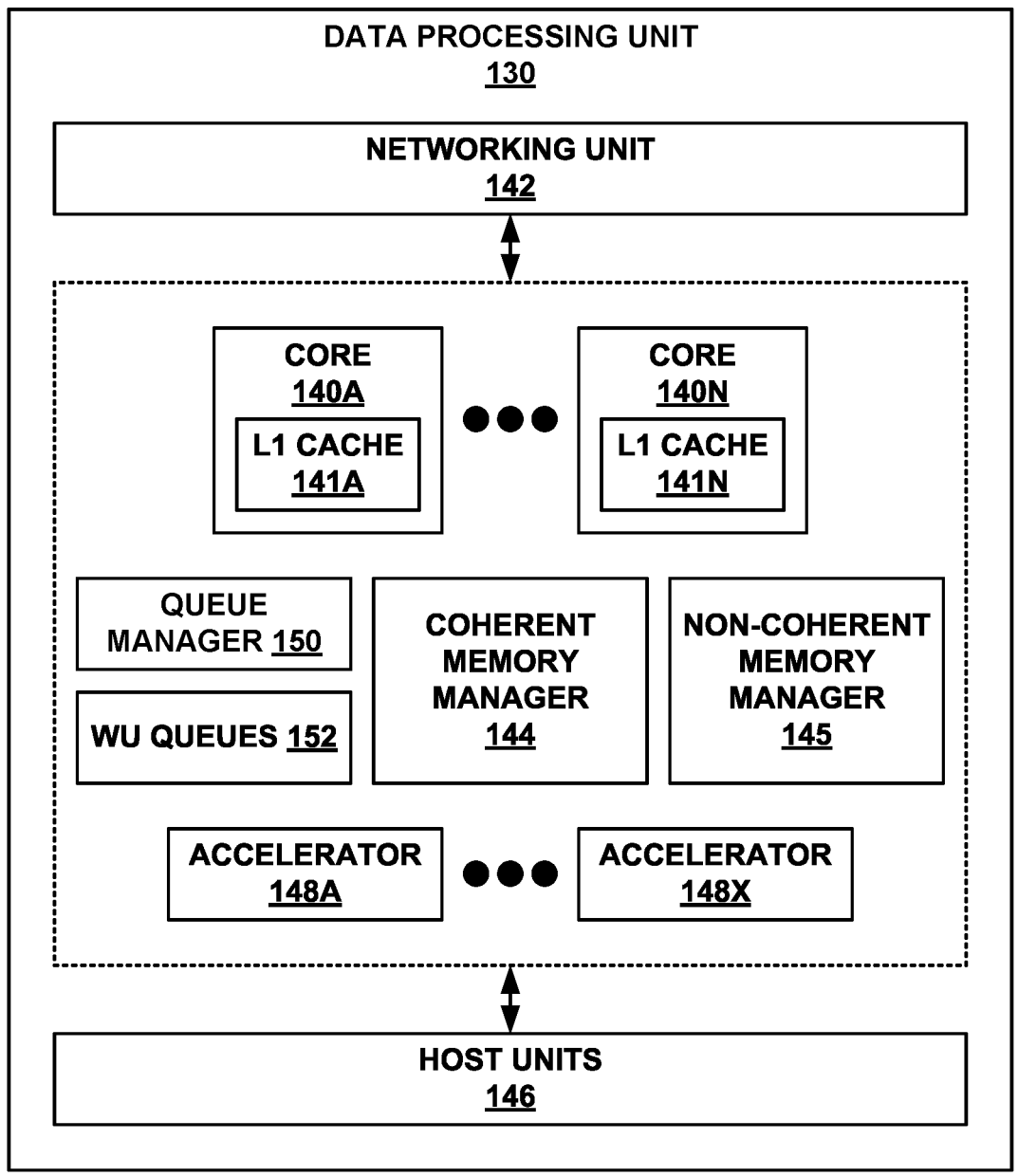
FIG. 3 is a block diagram illustrating hardware components of an example data processing unit, in accordance with the techniques of this disclosure.

FIG. 3 is a block diagram illustrating hardware components of an example data processing unit 130, in accordance with the techniques of this disclosure. DPU 130 generally represents a hardware chip implemented in digital logic circuitry. DPU 130 may operate substantially similar to any of the DPUs of the devices within racks 20, 22, 24, or 26 of FIG. 1A, DPU 32A of FIG. 1B, DPU 32B of FIG. 1C, or DPU 32C of FIG. 1D. Thus, DPU 130 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 3, DPU 130 includes a plurality of programmable processing cores 140A-140N ("cores 140"). DPU 130 may operate substantially similar to DPU 60 of FIG. 2 with the run-to-completion data plane OS 62 executing on each of cores 140. Each of cores 140 includes a respective one of level 1 caches 141A-N ("caches 141"). Caches 141 may include L1 buffer caches for caching non-coherent data, such as stream data units (e.g., packets or other data for stream processing). L1 buffer caches may store data for short-term caching, such that the data is available for fast access.

DPU 130 also includes a networking unit 142, a coherent memory manager 144, a non-coherent memory manager 145, one or more host units 146, a plurality of accelerators 148A-148X ("accelerators 148"), a queue manager 150, and a plurality of work unit (WU) queues 152. Although not illustrated in FIG. 3, each of cores 140, networking unit 142, coherent memory manger 144, non-coherent memory manager 145, host units 146, accelerators 148, queue manager 150, and WU queues 152 are communicatively coupled to each other.

In this example, DPU 130 represents a high performance, hyper-converged network, storage, and data processor and input/output hub. For example, networking unit 142 may be configured to send and receive stream data units with one or more external devices, e.g., network devices. Networking unit 142 may perform network interface card functionality, packet switching, and the like, and may use large forwarding tables and offer programmability. Networking unit 142 may expose network interface (e.g., Ethernet) ports for connectivity to a network, such as network 7 and/or switch fabric 14 of FIG. 1A. Each of host units 146 may expose one or more host interface (e.g., PCI-e) ports to send and receive stream data units with application processors (e.g., an x86 processor of a server device or a local CPU or GPU of the device hosting DPU 130) and/or data storage devices (e.g., SSDs). DPU 130 may further include one or more high bandwidth interfaces for connectivity to off-chip external memory (not illustrated in FIG. 3).

Each of accelerators 148 may be configured to perform acceleration for various data processing functions, such as lookups, matrix multiplication, cryptography, compression, regular expression processing, or the like. For example, accelerators 148 may comprise hardware implementations of lookup engines, matrix multipliers, cryptographic engines, compression engines, regular expression interpreters, or the like.

Queue manager 150 is configured to maintain and manipulate WU queues 152. At least one of WU queues 152 may be associated with each of cores 140 and configured to store a plurality of work units enqueued for processing on the respective one of the cores 140. In some examples, each of cores 140 may have a dedicated one of WU queues 152 that stores work units for processing by the respective one of cores 140. In other examples, each of cores 140 may have two or more dedicated WU queues 152 that store work units of different priorities for processing by the respective one of cores 140. As illustrated in FIG. 3, queue manager 150 and WU queues 152 are both physically centralized with respect to cores 140. WU queues 152, however, may be logically decentralized.

Data processing unit 130 may utilize two types of on-chip memory or memory devices, namely coherent cache memory and non-coherent buffer memory (not shown in FIG. 3). Coherent memory manager 144 is configured to control access to the coherent cache memory, and non-coherent memory manager 145 is configured to control access to the non-coherent buffer memory. In this way, any of the components of data processing unit 130 (i.e., cores 140, networking unit 142, host units 146, accelerators 148, queue manager 150, and WU queues 152) and any number of external devices (e.g., network devices, servers, external storage devices, or the like) may access the coherent cache memory via coherent memory manager 144 and access the non-coherent buffer memory via non-coherent memory manager 145. Memory managers 144, 145 may be configured to perform a number of operations to perform memory management in accordance with the present disclosure. More details on the bifurcated memory system of the DPU are available in U.S. patent application Ser. No. 15/949,892, filed Apr. 10, 2018, and titled "Relay Consistent Memory Management in a Multiple Processor System," the entire content of which is incorporated herein by reference.

Cores 140 may comprise one or more of MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or complex instruction set computing (CISC or x86) cores. Each of cores 140 may be programmed to process one or more events or activities related to a given packet flow such as, for example, a networking packet flow, a storage packet flow, a security packet flow, or an analytics packet flow. Each of cores 140 may be programmable using a high-level programming language, e.g., C, C++, or the like.

In some examples, the plurality of cores 140 executes instructions for processing a plurality of events related to each data packet of a packet flow, received by networking unit 142 or host units 146, in a sequential manner in accordance with one or more work units associated with the data packets. As described above, work units are sets of data exchanged between cores 140 and networking unit 142 or host unit 146 where each work unit may represent one or more of the events related to a given data packet. More specifically, a work unit is associated with one or more data packets, and specifies a software function for processing the data packets and further specifies one of cores 140 for executing the software function.

In general, to process a work unit, the one of cores 140 specified by the work unit is configured to retrieve the data packets associated with the work unit from a memory, and execute the software function specified by the work unit to process the data packets. For example, the one of cores 140 may retrieve the data packets from the non-coherent memory buffer via non-coherent memory manager 145, and cache the data packets in the one of caches 141 within the respective one of cores 140.

In a more detailed example, receiving a work unit is signaled by receiving a message in a work unit receive queue (e.g., one of WU queues 152). Each of WU queues 152 is associated with one of cores 140 and is addressable in the header of the work unit message. Upon receipt of the work unit message from networking unit 142, one of host units 146, or another one of cores 140, queue manager 150 enqueues a work unit in the one of WU queues 152 associated with the one of cores 140 specified by the work unit. After queue manager 150 dequeues the work unit from the one of WU queues 152, queue manager 150 delivers the work unit to the one of cores 140. Queue manager 150 then invokes the software function specified by the work unit on the one of cores 140 for processing the work unit.

To process the work unit, the one of cores 140 receives the work unit from the one of WU queues 152. The one of cores 140 then fetches the packets associated with the work unit from the one of caches 141 within the respective one of cores 140, and executes the invoked software function to process the packets. The one of cores 140 then outputs the corresponding results of processing the work unit back to WU queues 152. For example, upon processing the work unit, the one of cores 140 may generate a new work unit message by executing stored instructions to addresses mapped to a work unit transmit queue (e.g., another one of WU queues 152). The stored instructions write the contents of the message to the queue. The release of a work unit message from the one of cores 140 may be interlocked with (gated by) flushing of dirty data from the associated one of caches 141.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Figure 4:
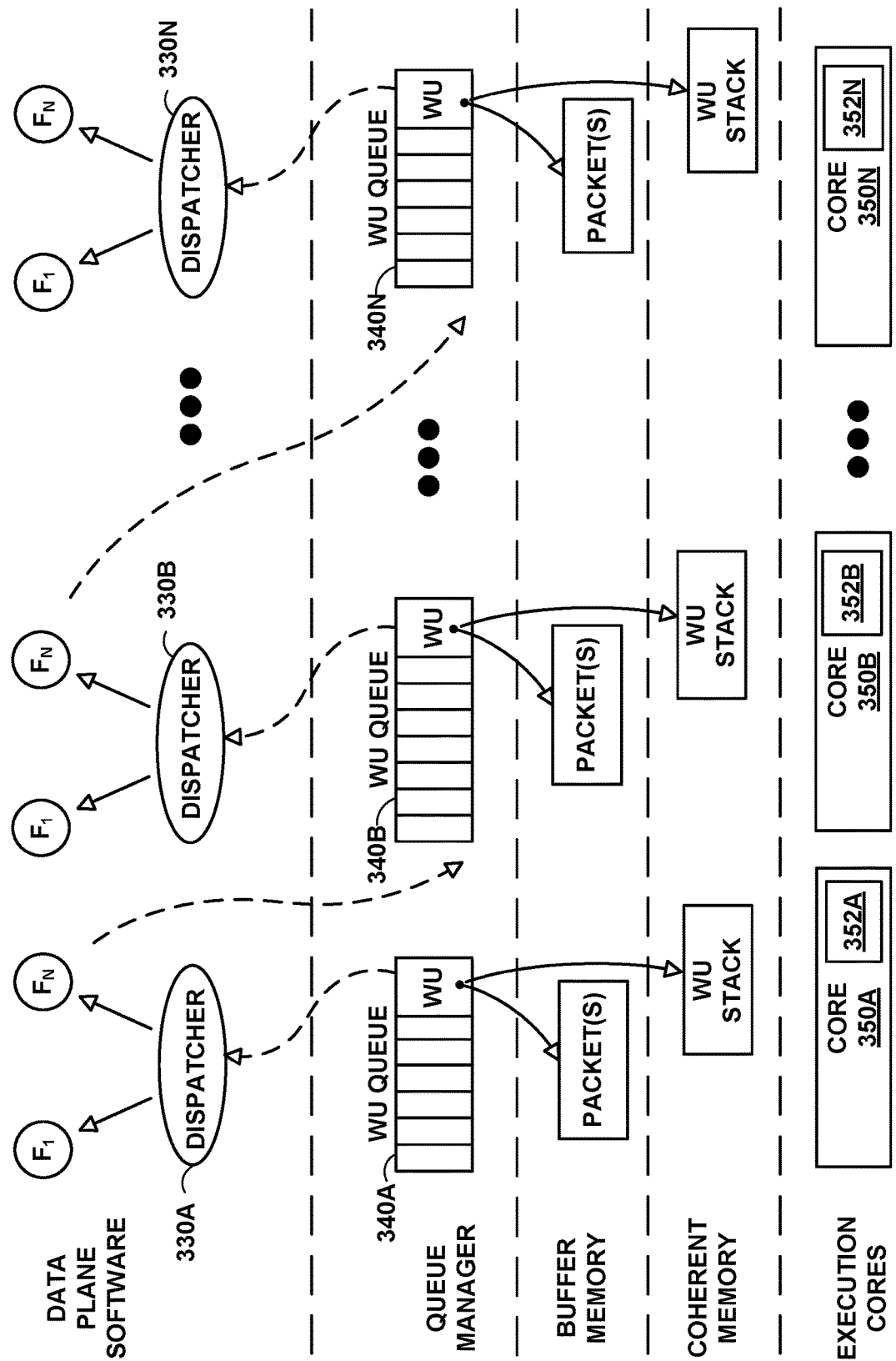
FIG. 4 is a flow diagram illustrating an example pipeline processing flow for processing stream data using work units in a data processing unit, in accordance with the techniques of this disclosure.

FIG. 4 is a flow diagram illustrating an example pipeline processing flow for processing stream data using work units in a DPU, in accordance with the techniques of this disclosure. FIG. 4 illustrates examples of multiple processing cores 350A-350N (which may correspond to cores 140 of FIG. 3), and which may each include an L1 buffer cache 352A-352N (which may correspond to caches 141 of FIG. 3).

FIG. 4 also illustrates coherent memory (which may correspond to the coherent cache memory managed by coherent memory manager 144 of FIG. 3), and non-coherent buffer memory (which may correspond to the non-coherent buffer memory managed by non-coherent memory manager 145 of FIG. 3). Moreover, as shown in FIG. 4, each core 350 is associated with a queue of work units 340 (which may correspond to WU queues 152 of FIG. 3) to be processed by the core. WU queues 340 may be queues maintained by queue manager 150 of FIG. 3.

As shown in FIG. 4, each core 350 executes data plane software for processing stream data units, such as data packets. The data plane software may correspond to data plane OS 62 of DPU 60 of FIG. 2. In this example, each core 350 provides an execution environment for a set of software functions (which may correspond to functions within library 70 executing on data plane 64 of DPU 60 of FIG. 2). In FIG. 4, the software functions are shown generally as F1-Fn, but are also referred to herein as event handlers or WU handlers. Each software function may be programmed in accordance with the run-to-completion programming model for applying one or more operations on stream data units. Moreover, the various software functions may represent different, discrete code portions for performing higher-level operations on a packet. For example, a group of software functions may, when chained together for processing a common one or more work units, perform a high-level operation, such as encryption, authentication, deep-packet inspection, and the like. Each individual software function in the group may represent a different, run-to-completion code portion of the overall operation to be performed, and the software functions for the group may be executed on the same or different cores 350.

As shown in the example of FIG. 4, each processing core 350 executes a corresponding one of dispatchers 330A-330N that services the respective WU queue 340 to be processed by the core. Each dispatcher 330 accesses the respective WU queue 340 for its core and, based on data structures within the work unit at the head of the queue, instantiates an instance of a software function (F) for processing the work unit.

As described herein, each work unit within WU queues 340 is associated with one or more stream data units to be processed by the respective core. In one example, each work unit includes an association with (e.g., a pointer to) one or more data packets and may also include an association with (e.g., a pointer to) a work unit stack ("WU stack") that carries program state, cached data and other information needed for program execution when processing the corresponding packets. As further described herein, in various examples, each work unit within WU queues 340 specifies (e.g., by an identifier or index) a software function F to be instantiated by dispatcher 330 for processing the work unit. In addition, each work unit includes an identifier for the core 350 or other hardware unit that sent the work unit and an identifier of the core 350 or other hardware unit to receive the work unit once processing is complete by the invoked software function F.

Upon instantiation by a dispatcher 330, the invoked software function F effectively provides seamless program execution to operate on the stream data units associated with the work unit using the program state, cached data and other information specified within the corresponding WU stack. During execution, the software function F may, for example, execute as a run-to-completion event handler for performing one or more particular operations on the stream data units. Moreover, continuity of program execution is maintained via the program state and cached data carried by the corresponding WU stack. While processing the work unit, the software function F may further manipulate the corresponding WU stack associated with the particular stream data units, e.g., data packets, by performing stack-like operations on the WU stack for the associated data packets and, optionally, directing the queue manager to create additional work units for further processing the associated data packets.

As further described herein, when processing a work unit, the corresponding instance of the software function F invoked by the dispatcher may perform stack-like operations on the WU stack flowing along with the data packets in the processing pipeline. In other words, the WU stack may be viewed as a set of work units that collectively implement an overall logical function, where the work units have not been yet been enqueued for processing. The work units are arranged in the WU stack in a stack format and may be manipulated (inserted, removed, etc.) by software functions F using stack operations to specify future work units for the overall logical function. The software function F may, for example, access a current frame within the WU stack for program state, cached data and any input or output variables for performing the corresponding function on the data packets. In addition, the software function may effectively 'pop' the current frame from the WU stack, push additional work unit frames on the WU stack, and/or cause additional work units to be created and enqueued within WU queues 340 for performing additional code portions (functions) on the work unit. In this way, the WU stack may be used to facilitate program execution and pipelining of an overall logical function using multiple software functions, where it is undesirable to execute all operations in a single run-to-completion event on a single core.

An application programming interface (API) may be utilized by software functions (F) for interacting with and manipulating the WU stacks associated with stream data units (e.g., data packets) being processed by the multiple processing cores. For example, a software function (F) can manipulate a WU stack by performing stack-like operations, such as allocating a WU stack, freeing a WU stack, pushing new frames onto an existing WU stack. In addition, the API may further allow a software function to send a continuation in association with a specific frame pushed on a WU stack, which in turn causes a work unit having a pointer to the frame to be enqueued in a WU queue for processing.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Various examples have been described. These and other examples are within the scope of the following claims.

What is claimed is:

1. A device comprising:
a data processing unit integrated circuit comprising:
at least one interface configured to send and receive stream data units comprising data packets for one or more packet flows,
a plurality of programmable processing cores,
a plurality of work unit queues, wherein each work unit queue of the plurality of work unit queues is associated with one of the programmable processing cores and configured to store a plurality of work units enqueued for processing on the one of the programmable processing cores, wherein each work unit of the plurality of work units is associated with one or more of the stream data units; and
a queue manager executable on a data plane operating system, wherein the queue manager is configured to receive a first work unit specifying a software function for executing on the associated programmable processing core, enqueue the first work unit to an associated one of the plurality of work unit queues, and dequeue the first work unit from the associated one of the plurality of work unit queues to the associated programmable processing core, so as to serialize packet processing such that data packets of a same packet flow are processed by a same programmable processing core.

2. The device of claim 1, wherein the queue manager is physically centralized with respect to the one of the programmable processing cores.

3. The device of claim 1, wherein the queue manager is further configured to:
upon dequeuing the first work unit from the associated one of the plurality of work unit queues to the associated programmable processing core, invoke the software function specified by the first work unit for execution on the data plane operating system on the associated programmable processing core for processing the one or more of the stream data units.

4. The device of claim 3, wherein the software function directs the queue manager to create additional work units for further processing the associated data packets.

5. The device of claim 1, wherein the queue manager is further configured to manage work unit interfaces.

6. A device comprising:
a data processing unit integrated circuit having at least one interface configured to send and receive stream data units comprising data packets for one or more packet flows, and a plurality of programmable processing cores;
a data plane operating system configured to execute on one or more of the plurality of programmable processing cores;
a software function invoked for execution on the data plane operating system on one of the programmable processing cores to process a work unit, wherein the work unit is associated with one or more of the stream data units; and
a queue manager executable on the data plane operating system, wherein the queue manager is configured to:
receive a first work unit associated with one or more data packets of the stream data units, the first work unit specifying the software function;
enqueue the first work unit to a work unit queue associated with the programmable processing core for the stream data units; and
dequeue the first work unit from the work unit queue to the programmable processing core so as to serialize packet processing such that data packets of a same packet flow are processed by a same programmable processing core.

7. The device of claim 6, wherein the queue manager is physically centralized with respect to the one of the programmable processing cores.

8. The device of claim 6, wherein the queue manager is further configured to:
upon dequeuing the first work unit from the work unit queue associated with the one of the programmable processing cores, invoke the software function specified by the work unit for execution on the data plane operating system on the one of the programmable processing cores specified by the work unit for processing the one or more of the stream data units.

9. The device of claim 8, wherein the software function directs the queue manager to create additional work units for further processing the associated data packets.

10. The device of claim 6, wherein the queue manager is further configured to manage work unit interfaces.

11. A system comprising:
a network;
at least one of an application processor or a storage device; and
a device configured to send and receive stream data units with the network and the at least one of the application processor or the storage device, the device comprising:
a data processing unit integrated circuit comprising:
at least one interface configured to send and receive stream data units comprising data packets for one or more packet flows,
a plurality of programmable processing cores,
a plurality of work unit queues, wherein each work unit queue of the plurality of work unit queues is associated with one of the programmable processing cores and configured to store a plurality of work units enqueued for processing on the one of the programmable processing cores, wherein each work unit of the plurality of work units is associated with one or more of the stream data units; and a queue manager executable on a data plane operating system, wherein the queue manager is configured to receive a first work unit specifying a software function for executing on the associated programmable processing core, enqueue the first work unit to an associated one of the plurality of work unit queues, and dequeue the first work unit from the associated one of the plurality of work unit queues to the associated programmable processing core, so as to serialize packet processing such that data packets of a same packet flow are processed by a same programmable processing core.

12. The device of claim 11, wherein the queue manager is physically centralized with respect to the one of the programmable processing cores.

13. The device of claim 11, wherein the queue manager is further configured to:

upon dequeuing the first work unit from the work unit queue associated one of the plurality of work unit queues to the associated programmable processing core, invoke the software function specified by the first work unit for execution on the data plane operating system on the associated programmable processing core for processing the one or more of the stream data units.

14. The device of claim 13, wherein the software function directs the queue manager to create additional work units for further processing the associated data packets.

15. The device of claim 11, wherein the queue manager is further configured to manage work unit interfaces.

16. The device of claim 11, further comprising a data plane operating system configured to execute on at least the one of the programmable processing cores.

* * * * *